United States Patent
Kang et al.

(10) Patent No.: US 12,267,268 B2
(45) Date of Patent: Apr. 1, 2025

(54) BEAM SELECTION APPARATUS AND METHOD IN WIRELESS COMMUNICATION SYSTEM

(71) Applicants: Samsung Electronics Co., Ltd., Suwon-si (KR); KOREA UNIVERSITY RESEARCH AND BUSINESS FOUNDATION, Seoul (KR)

(72) Inventors: Chunggu Kang, Seoul (KR); Jaewon Lee, Seoul (KR)

(73) Assignees: Samsung Electronics Co., Ltd., Suwon-si (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 340 days.

(21) Appl. No.: 17/745,081

(22) Filed: May 16, 2022

(65) Prior Publication Data

US 2023/0025961 A1    Jan. 26, 2023

(30) Foreign Application Priority Data

Jul. 22, 2021    (KR) .................. 10-2021-0096248

(51) Int. Cl.
*H04L 5/00* (2006.01)
(52) U.S. Cl.
CPC ............ *H04L 5/0051* (2013.01); *H04L 5/006* (2013.01)
(58) Field of Classification Search
CPC .............................. H04L 5/0051; H04L 5/006
See application file for complete search history.

(56) References Cited

U.S. PATENT DOCUMENTS

| 2011/0211490 | A1* | 9/2011 | Nikula | H04B 7/086 370/252 |
| 2019/0116605 | A1* | 4/2019 | Luo | H04W 72/0446 |
| 2021/0349171 | A1* | 11/2021 | Gao | G01S 5/0284 |

FOREIGN PATENT DOCUMENTS

| WO | 2018/030811 A1 | 2/2018 | |
| WO | WO-2020018235 A1 * | 1/2020 | ......... H04B 17/318 |
| WO | WO-2020204887 A1 * | 10/2020 | ......... H04B 7/0617 |

* cited by examiner

*Primary Examiner* — Brian P Cox
(74) *Attorney, Agent, or Firm* — Jefferson IP Law, LLP

(57) ABSTRACT

The disclosure relates to a 5G or 6G communication system for supporting higher data transmission rates than 4G communication systems such as LTE systems. A method performed by a receiving apparatus in a wireless communication system is provided. The method includes receiving reference signals from a transmitting apparatus, estimating respective channel component values of the reference signals, determining whether at least one reference channel component value which is equal to or greater than a first threshold is present among the channel component values of the reference signals, selecting a candidate beam based on the at least one reference channel component value in case that the at least one reference channel component value is present, determining whether a value of signal quality of the first candidate beam is equal to or greater than a second threshold, and selecting the candidate beam as a final beam in case that the value of signal quality of the candidate beam is equal to or greater than the second threshold.

12 Claims, 15 Drawing Sheets

|  | SNR | | |
|---|---|---|---|
|  | [-20dB, -11dB] | [-11dB, -6dB] | [-6dB, 0dB] |
| Pilot length: 20 | -11.7dB | -14.63dB | -17.98dB |
| Pilot length: 40 | -15.04dB | -17.59dB | -20.78dB |
| Pilot length: 80 | -17.82dB | -20.54dB | -24.24dB |
| Pilot length: 5 (randomly selected beam pairs) + SRCNN | -10.3dB | -13.21dB | -17.02dB |
| Pilot length: 10 (randomly selected beam pairs) + SRCNN | -13.4dB | -15.73dB | -21.11dB |
| Pilot length: 5 (highest beam pairs in BS) + SRCNN | -15.74dB | -18.01dB | -21.37dB |
| Pilot length: 10 (highest beam pairs in BS) + SRCNN | -18.22dB | -21.27dB | -25.54dB |

FIG.12

BEAM SELECTION APPARATUS AND METHOD IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0096248, filed on Jul. 22, 2021, in the Korean Intellectual Property Office, the disclosure of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) Samsung Electronics Co., Ltd. and 2) Korea University Research and Business Foundation.

BACKGROUND

1. Field

The disclosure relates to an apparatus and method for selecting a beam in a wireless communication system. More particularly, the disclosure relates to an apparatus and method for selecting a beam based on a channel component.

2. Description of Related Art

For higher data transmit rates, 5th generation (5G) communication systems are considered to be implemented on ultra-high frequency bands (mmWave), such as, e.g., 60 gigahertz (GHz). To mitigate pathloss on the ultra-high frequency band and increase the reach of radio waves, discussions have been had of such technologies as beamforming, massive multi-input multi-output (MIMO), full dimensional MIMO (FD-MIMO), array antenna, analog beamforming, and large scale antenna, as adopted for 5G communication systems.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

With the development of the above-enumerated techniques for communication systems, there is an increasing demand for technology that provides a wider bandwidth and enhanced transmission/reception performance to user equipments (UEs) (or terminals). To live up to the demand, 6th generation (6G) communication systems take terahertz (THz) bands (e.g., a band of 100 GHz or higher) into consideration and are capable of finer beam formation with the ability to accommodate more antennas. Downlink beamforming is a scheme in which a single or multiple base stations (BSs) perform transmission to one or several UEs, and the opposite is referred to as uplink beamforming by UE. As an increase in the number of antennas for beamforming to the UE or the BS leads to the resolution of a beam book for indicating it, and as many pilot signals as the total number of the beams are required for measuring reference signal received power (RSRP) overhead is expected to linearly increase. Further, the frequency efficiency for transmitting data may be significantly decreased because a long delay occurs due to signaling necessary for finally selecting a beam.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for selecting a beam in a wireless communication system.

Another aspect of the disclosure is to provide an apparatus and method for selecting a beam based on a channel component in a wireless communication system.

Additional aspects will be set forth in part in the description which follows and, in part, will be apparent from the description, or may be learned by practice of the presented embodiments.

In accordance with an aspect of the disclosure, an apparatus and method for selecting a beam based on channel components and a deep learning-based channel estimation scheme in a wireless communication system are provided. The method performed by a receiving apparatus in a wireless communication system includes receiving reference signals from a transmitting apparatus, estimating respective channel component values of the reference signals, determining whether at least one first reference channel component value which is equal to or greater than a first threshold is present among the channel component values of the reference signals, selecting a first candidate beam based on the at least one first reference channel component value in case that the at least one first reference channel component value is present, determining whether a value of signal quality of the first candidate beam is equal to or greater than a second threshold, and selecting the first candidate beam as a final beam in case that the value of signal quality of the first candidate beam is equal to or greater than the second threshold.

In accordance with another aspect of the disclosure, a method performed by a transmitting apparatus in a wireless communication system is provided. The method includes transmitting reference signals to a receiving apparatus, receiving a signal requesting transmission of additional reference signals from the receiving apparatus, transmitting the additional reference signals to the receiving apparatus in response to the request signal, and transmitting and receiving a signal to/from the receiving apparatus through a final beam. The final beam may be a candidate beam with a signal quality which is equal to or greater than a second threshold, among candidate beams selected based on at least one reference channel component value which is equal to or greater than a first threshold from among respective channel component values of the additional reference signals.

In accordance with another aspect of the disclosure, a receiving apparatus in a wireless communication system is provided. The receiving apparatus includes a transceiver and at least one processor. The at least one processor may be configured to receive reference signals from a transmitting apparatus, estimate respective channel component values of the reference signals, determine whether at least one first reference channel component value which is equal to or greater than a first threshold is present among the channel component values of the reference signals, select a first candidate beam based on the at least one first reference channel component value in case that the at least one first reference channel component value is present, determine whether a value of signal quality of the first candidate beam is equal to or greater than a second threshold, and select the first candidate beam as a final beam in case that the value of signal quality of the first candidate beam is equal to or greater than the second threshold.

In accordance with another aspect of the disclosure, a transmitting apparatus in a wireless communication system is provided. The transmitting apparatus includes a transceiver and at least one processor. The at least one processor may be configured to transmit reference signals to a receiving apparatus, receive a signal requesting transmission of additional reference signals from the receiving apparatus, transmit the additional reference signals to the receiving apparatus in response to the request signal, and transmit and receive a signal to/from the receiving apparatus through a final beam. The final beam may be a candidate beam with a signal quality which is equal to or greater than a second threshold, among candidate beams selected based on at least one reference channel component value which is equal to or greater than a first threshold from among respective channel component values of the additional reference signals.

According to various embodiments, it is possible to select a beam based on a channel component in a wireless communication system.

According to various embodiments, it may be possible to select a beam based on a channel component and a deep learning-based channel estimation scheme in a wireless communication system.

According to various embodiments, it may be possible to select a beam to be able to reduce pilot overhead and a delay necessary for signaling in a wireless communication system.

According to various embodiments, it may be possible to select a beam to be able to increase frequency efficiency based on a channel context in a wireless communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 12 is a view illustrating normalized mean square errors (NMSEs) in a channel reconstructed by a BMCC according to M and an actual channel at a low signal-to-noise ratio (SNR) according to an embodiment of the disclosure;

Throughout the drawings, it should be noted that like reference numbers are used to depict the same or similar elements, features, and structures.

DETAILED DESCRIPTION

Figure 1:
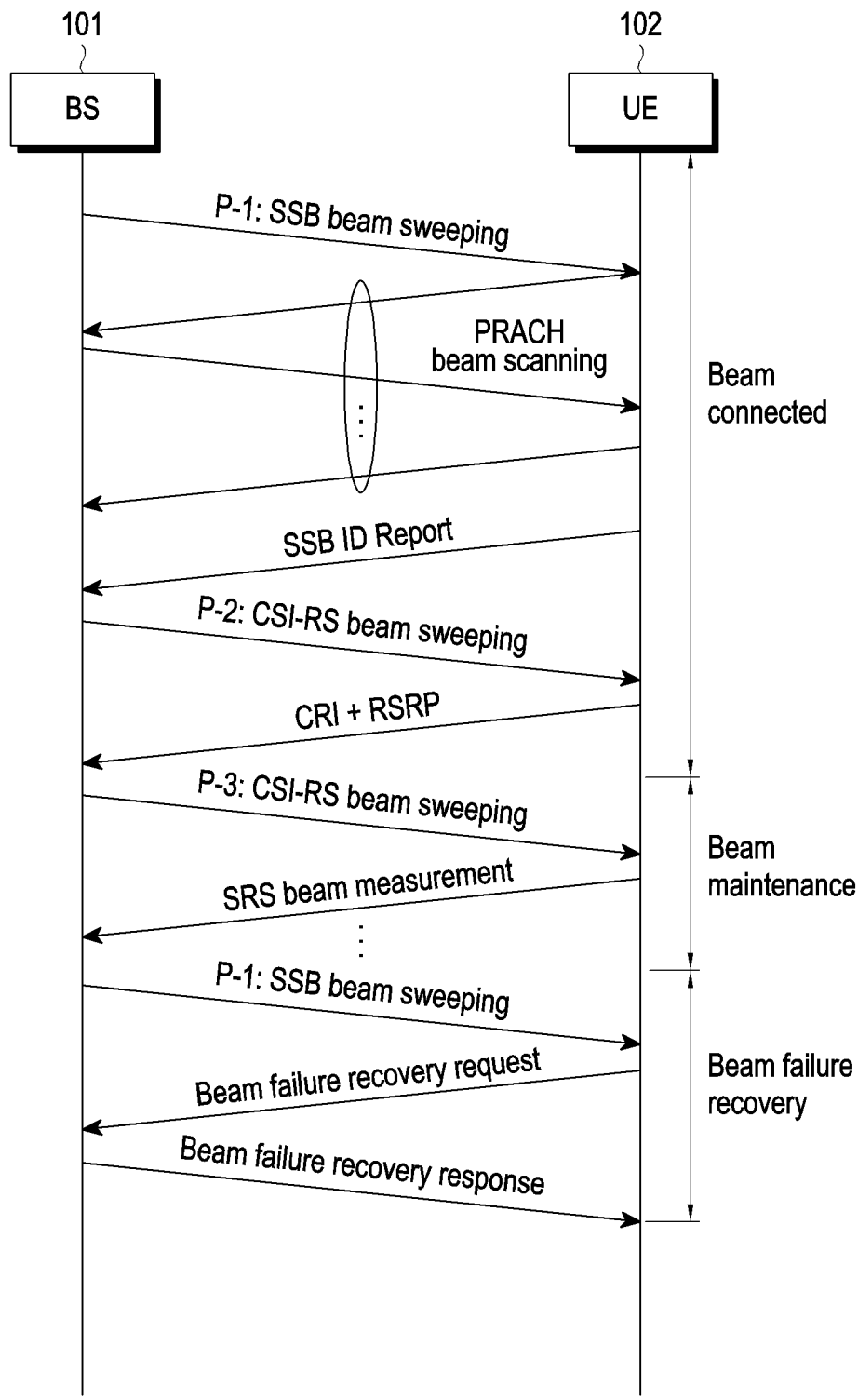
FIG. 1 is a view illustrating a beam selection procedure according to beam management in a 5G communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments, the description of technologies that are known in the art and are not directly related to the disclosure is omitted.

This is for further clarifying the gist of the disclosure without making it unclear.

For the same reasons, some elements may be exaggerated or schematically shown. The size of each element does not necessarily reflect the real size of the element. The same reference numeral is used to refer to the same element throughout the drawings.

Advantages and features of the disclosure, and methods for achieving the same may be understood through the embodiments to be described below taken in conjunction with the accompanying drawings.

However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operations are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or subunits. Further, an element or a 'unit' may be implemented to reproduce one or more central processing units (CPUs) in a device or a security multimedia card.

For ease of description, some of the terms or names defined in the 3rd generation partnership project (3GPP) standards (standards for 5G, new radio (NR), long-term evolution (LTE), or similar systems) may be used. The use of these terms, however, does not limit the embodiments of the disclosure by the terms and names, and the embodiments of the disclosure may be applied likewise to systems conforming to other standards, and modifications may be made thereto without departing from the technical spirit of the disclosure.

As used herein to determine whether a specific condition is met or fulfilled, when A is more than B, A may also be not less than B or A may be equal to or more than B and, when A is less than B, A may also be not more than B or A may be equal to or more than B. The expressions "not less than," "not more than," and "not less than and less than" may be replaced with "more than," "less than," and "more than and not more than," respectively.

In a mobile communication system composed of one cell, a transmit/receive antenna is disposed in the center of the cell. The cell transmits a reference signal (RS) to measure the downlink channel state of the cell when performing mutual communication with UEs in the cell. The reference signal may be, e.g., a pilot signal (or may also be referred to as a pilot). According to 3GPP standards (e.g., long-term evolution (LTE), 5th generation (5G), and new radio (NR)), the RSs transmitted from the base station include a channel state information reference signal (CSI-RS) and a demodulation-reference signal (DM-RS). The UE may measure the channel state between the base station and the UE using the CSI-RS and may feed channel state information back to the base station. Further, the UE may estimate a downlink channel using the DM-RS and may decode the resource allocated thereto based on the estimated channel.

Although the term "UE" is used below in describing various embodiments, other terms may also be used, such as "terminal," "electronic device," "mobile station (MS)," "mobile equipment (ME)," "user equipment," "user terminal (UT)," "subscriber station (SS)," "wireless device," "handheld device," or "access terminal (AT)." Alternatively, in various embodiments, the UE may be, e.g., a device having communication functionality, such as a mobile phone, a personal digital assistant (PDA), a smart phone, a wireless modem, or a laptop computer.

FIG. 1 is a view illustrating a beam selection procedure according to a beam management scheme in a 5G communication system according to an embodiment of the disclosure.

Referring to FIG. 1, ultra-high frequency bands go through no or little reflection or diffraction and are thus very vulnerable to blockage of straight waves. To address such issue, analog beam forming may be applied, and such a scheme may be considered as is efficiently operated on significantly sparse multi-path characteristics. In relation to mobility, continuous beam management needs to be carried out to secure proper beam performance.

To that end, the 5G standards define the layer ½ procedure to obtain and maintain a beam set for the base station (BS) 101 and the UE 102 through a diversity of functions, such as beam sweeping, beam measurement, beam report, beam determination, beam maintenance, and beam recovery. Reference signals used for downlink beam management may include a synchronization signal block (SSB) and a channel state information-reference signal (CSI-RS). Reference signals used for uplink beam management may include a sounding reference signal (SRS). The SSB includes a synchronization signal block and a physical broadcasting channel (PBCH). Unlike the synchronization signal block and PBCH in LTE, which have fixed positions in the time domain and frequency domain in every subframe, the SSB is transmitted in various patterns according to the subcarrier spacing (SCS) and some other parameters. Further, a set of multiple SSBs is defined as a synchronization signal (SS) burst set, which is repeated at a given period (e.g., every 20 ms). Further, since the multiple SSBs of the SS burst set are repeatedly transmitted in different beams, the UE may measure different SSBs to determine the best BS transmission beam during an initial access step.

The current standards define, as beam management procedures, three types of beam sweeping procedures, such as a procedure (P-1) for initial transmission/reception beam selection, a BS transmission beam fine-tuning procedure (P-2), and a procedure (P-3) for UE reception beam change, in the radio resource control (RRC) connected state. For example, in the procedure (P-1) for initial transmission/reception beam selection, the BS performs beam sweeping to transmit a unique reference signal in each beam over the entire sector. In this case, since the width of each beam is large, the number of beams to be swept is limited. Then, for the best beam reported from the UE in such a scheme as SSB ID reporting, the BS may perform beam sweeping at a narrow angle to thereby fine-tune the beam. In the following procedure, the UE performs a procedure (P-2) for tuning the beam transmitted from the BS. The UE detects an optimal beam among the transmission beams of the BS swept to a narrower range through a wide beam and reports it to the BS. Then, in the procedure (P-3) for changing the reception beam of the UE, when the BS fixes the beam selected based on the UE's report and repeatedly transmits signal, the UE sweeps its own beam at a narrow angle and determines an optimal beam pair between the BS and the UE. Beam maintenance is required to deal with beam misalignment, which implements beam tracking and refinement, allowing the beam to be switched into another beam of better quality. When it is impossible to maintain a communication link with an existing beam, beam recovery is required to search for a new beam, which is newly performed from the beam sweeping step. Beam measurement is intended for measuring the quality of different beams in the SSB or CSI-RS transmitted by the BS.

However, according to the above-described beam management procedure, analog beam selection schemes cause too much pilot overhead and delay. Further, since beam selection is performed only from among analog beam-adopted pilot signals in the beambook, the selected beam is highly unlikely to be the best beam. Proposed to address this issue is a scheme of selecting a beam by estimating a value of a channel component, in other words, a channel component value, including at least one of the angle of arrival (AoA), angle of departure (AoD), or delay, for each antenna element in the limited pilot signal, as well as beam selection in power units of channel quality (e.g., reference signal received power (RSRP)). In the embodiments, a channel component whose channel component value is equal to or greater than a threshold is referred to as a best matching channel component (BMCC). The BMCC may be referred to as a reference channel component. Although embodiments where AoA, AoD, and delay are used as channel components are described as an example, other various parameters than AoA, AoD, and delay may be used as channel components. Although embodiments where RSRP is used as channel quality is described as an example, other various parameters than RSRP, e.g., received signal strength indicator (RSSI), channel quality indicator (CQI), signal to noise ratio (SNR), signal to interference ratio (SIR), signal to interference and noise ratio (SINR), or reference signal reception quality (RSRQ), may be used as channel quality.

Considered is a multi-antenna system having $N_t$ transmit antennas and $N_r$ receive antennas. In general, only analog beam-applied effective channels, rather than all per-antenna element channels, may be estimated through the pilot signal received through the CSI-RS or SRS, and this way may thus be inappropriate for estimation of channel components. When the number of dominant paths is L, ultra-high frequency channels are sparse channels in which L is very small. In this case, it is assumed that the AoA, AoD, and delay of the lth path are $\theta_l$, $\phi_l$, and $\tau_l$, respectively. In this case, if the resolution of AoA and AoD is an integer G, then $\theta_l$, $$\phi_l \in \left\{0, \pm\frac{2\pi}{G}, \pm\frac{4\pi}{G}, \ldots \pm\frac{2\pi(G-1)}{G}\right\}.$$

If the resolution of the delay is an integer T, then $$\tau_l \in \left\{0, \frac{1}{T}, \frac{2}{T}, \ldots \frac{T-1}{T}\right\}.$$

If the channel matrix in the spatial domain is $\hat{H}$, this may be expressed as in Equation 1.

$$\hat{H} = \sum_{l=1}^{L} \alpha_l \left(a_{RX}^H(\theta_l) \otimes a_{TX}(\phi_l)\right) a_F^T(\tau_l) \qquad \text{Equation 1}$$

Here, $\alpha_l$ is the gain in the lth path, and $a_{TX}(°)$ $a_{RX}(')$, respectively, are the array steering vectors of the transmit and receive antennas defined as in Equations 2 and 3.

$$a_{RX}(\theta_l) = \frac{1}{\sqrt{N_r}}\left[1, e^{j2\pi d \sin(\theta_l)/\lambda}, \ldots, e^{j2\pi(N_r-1)d\sin(\theta_l)/\lambda}\right]^T \qquad \text{Equation 2}$$

-continued $$a_{TX}(\phi_l) = \frac{1}{\sqrt{N_t}}\left[1, e^{j2\pi d\sin(\phi_l)/\lambda}, \ldots, e^{j2\pi(N_t-1)d\sin(\phi_l)/\lambda}\right]^T \quad \text{Equation 3}$$

$a_F(\cdot)$ is the discrete Fourier transform (DFT) vector indicating the channel for each of K subcarriers defined as in Equation 4.

$$a_F(\tau_l) = \frac{1}{\sqrt{K}}\left[1, e^{j2\pi k\tau_l f/K}, \ldots, e^{j2\pi(K-1)\tau_l f/K}\right]^T \quad \text{Equation 4}$$

In the channel of Equation 1, $L=\min(N_rN_t, K)$, which is established in a general millimeter wave band ($\hat{H}$ is a sparse matrix). Among the pilot signals transmitted from the BS or the UE over the time domain and frequency domain, the $m^{th}$ pilot signal is assumed to be represented as $q_m$ (m=1, 2, ..., M). A specific analog precoder and combiner to be applied thereto are assumed to be $F_m$ and $W_m$, respectively. If the pilot signal received for the mth pilot signal is $\Phi_m$, it is given as $\Phi_m = (q_m^T F_m^T \otimes w_m^H)$. If $\Phi=[\Phi_1, \Phi_2, \ldots, \Phi_N]$, the received signal (referred to as a measurement matrix) may be expressed as in Equation 5.

$$M = \Phi^H \hat{H} + N \quad \text{Equation 5}$$

Here, since noise N becomes colored noise due to the combiner, it needs to be converted into white noise through the whitening filter of the measurement matrix. A covariance matrix for noise before whitening may be expressed as in Equation 6.

$$C = \begin{bmatrix} W_1^H W_1 & 0 & \ldots & 0 \\ 0 & W_2^H W_2 & \ldots & 0 \\ \vdots & \vdots & \ddots & \vdots \\ 0 & 0 & \ldots & W_M^H W_M \end{bmatrix} \quad \text{Equation 6}$$

The received signal whitened using Cholesky decomposition C may be expressed as in Equation 7.

$$\begin{aligned} M_w &= D_w^{-1} M \\ &= D_w^{-1} \Phi^H \hat{H} + D_w^{-1} N \\ &= \Phi_w^H \hat{H} + N_w \end{aligned} \quad \text{Equation 7}$$

In Equation 7, $\Phi_w^H = D_w^{-1} \Phi^H$, and it is thereby possible to estimate, from $M_w$, $\hat{H}$. In other words, channel estimation corresponds to the optimization issue given in Equation 8.

$$\min_{\hat{H}_w} \|M_w - \Phi_w^H \hat{H}\|_F \quad \text{Equation 8}$$

There may be several schemes to address this issue and, among them, orthogonal matching pursuit (OMP) may be used which is one of compressive sensing-based detection algorithms using the sparsity of $\hat{H}$. OMP is a scheme for searching for BMCCs by repeating the process of projecting $M_w$ to a preset spatial domain channel grid to extract best matching channel components (BMCCs) one by one until a specific reference value is met. In this case, the value obtained by projecting $M_w$ to the channel space is given as in Equation 9.

$$d_{\phi_l,\theta_l,\tau_l} = |(a_{TX}^H(\theta_l) \otimes a_{RX}(\phi_l))^H \Phi_w M_w a_F^T(\tau_l)| \quad \text{Equation 9}$$

A channel path that maximizes Equation 9 is searched, which corresponds to Equation 10.

$$\max_{\phi_l,\theta_l,\tau_l} d_{\phi_l,\theta_l,\tau_l} \quad \text{Equation 10}$$

Through the BMCC searched here, $g_{\phi_l,\theta_l,\tau_l} = \text{vec}\{M_w \text{vec}(a_{TX}^H(\theta_l) \otimes a_{TX}(\phi_l)) a_F^T(\tau_l)\}$ may be calculated, and least squares solution of the $\Phi_w$ with the extracted value may be obtained to thereby estimate a gain $(\alpha_l)$. Therefore, after removing, $\theta_l$, $\phi_l$, and $\tau_l$ through Equation 11, the residual measurement matrix is updated.

$$M_w \leftarrow M_w - \alpha_l g_{\phi_l,\theta_l,\tau_l} \quad \text{Equation 11}$$

With the $M_w$ updated according to Equation 11, a BMCC is searched again by [Equation 10], and the search process is repeated until the BMCC meets a specific criterion condition. For example, with a threshold of the BMCC value, the search process may be repeated until no more BMCCs exceeding the threshold exist. Various schemes for extracting BMCCs may be considered and, thus, other algorithms than OMP may also be used.

In various embodiments, channel components considered are divided into angles, such as AoA and AoD, the gain $\alpha_l$ corresponding to the lth channel path, and delay. Not only are required a relatively large number of pilot signals, but large complexity may also ensue to detect precise values of channel components. However, a relatively small number of pilot signals may be used using a quantized grid to detect only approximate values of channel components. Therefore, the value obtained by projecting the measurement matrix within the entire grid range of each channel component is Equation 9, and the largest AoA, AoD, and delay may be searched through Equation 10. In contrast, $\alpha_l$ in Equation 11 may be the same as $\alpha_l$ in Equation 1, and $\alpha_l$ may be estimated with the BMCC obtained in Equation 10.

In various embodiments, the channel components may include at least one of AoA, AoD, and delay. Although embodiments where AoA, AoD, and delay are used as channel components are described as an example, other various parameters than AoA, AoD, and delay may be used as channel components.

In various embodiments, the respective values of the channel components may be measured based on pilot signals and, among the measured values of the channel components, a channel component having a measured value equal to or more than a set threshold is referred to as a BMCC. For example, when the channel component is AoA, if an AoA measurement value which is equal to or greater than the threshold is among AoA values measured based on pilot signals, the AoA having the measurement value not less than the threshold may be a BMCC.

In such a channel estimation process, if the number of symbols of the pilot signal is small, a large number of wrong paths may be extracted so that the accuracy of the reconstructed channel is decreased, and performance of beam selection may thus be deteriorated. In other words, the accuracy of obtaining a BMCC may vary depending on the number (or length) of the pilot signals and, to address such issue, sufficient pilot signals need to be secured. However, overhead due to an increase in the number of pilot signals needs to be considered, and therefore, there is required a task of reproducing channel characteristics of a level that may be secured with a large number of pilot signals, using only the characteristics of a small number of pilot signals. It is possible to perform the reproduction task for increasing channel accuracy only with limited pilot signals using a neutral network previously trained by deep learning scheme to be capable of high-accuracy channel estimation even with a small number of pilots.

By combining such channel estimation and deep learning-based reproduction task, a beam selection scheme using gradual channel estimation may be performed. Initially, a small number of periodic pilot signals are used, and the number and size of BMCCs extracted thereby are identified. By so doing, it is possible to identify the main characteristics of the channel, such as whether the line of sight (LoS) of the channel is secured and the approximate path AoA and AoD. If BMCCs ($\theta_l$, $\phi_l$, $\tau_l$) which exceed a specific threshold are extracted, a beam corresponding to the BMCC having the maximum value among the channel component values may be selected, or the most similar beam may be selected through linear combination for a plurality of BMCCs.

If no BMCC whose channel component value exceeds the threshold is extracted, the resolution of the pilot signal may be enhanced. This is a reproduction task that renders it possible to have more sophisticated channel characteristics through a deep learning-based neural network (NN). In this case, interpolation needs to precede for mapping the measurement matrix obtained by a small amount of pilot signals in the process of reproducing channel characteristics with the dimension of the measurement matrix obtainable with a target amount of pilot signals. In this case, inaccurate interpolation greatly affects the accuracy of the measurement matrix obtained by the NN. Thus, if the RSRP of the beam selected in the beam determination step is not better than a specific threshold, the BS or the UE, which is the subject of beam selection, sends out control information for requesting an additional pilot. It is possible to increase the resolution through interpolation using the additional pilot signal. If a measurement matrix with enhanced resolution is secured by so doing, the BMCC extraction process performed before is repeated. Among the BMCCs extracted with the resolution-enhanced measurement matrix, those whose channel component values exceed the threshold are used to select a beam in the same way.

If no BMCC whose channel component value exceeds the threshold is detected, the BS or UE sends a control signal to request an additional pilot signal. If a measurement matrix with sufficient resolution is thereby secured, BMCCs may be extracted with higher accuracy, and channels for each antenna element in subcarrier units with higher accuracy may be secured through channel reconstruction. Therefore, since near-perfect channel state information at the transmitter (CSIT) or channel state information at the receiver (CSIR) is secured, using the selectively reconstructed channel, it may also be used to select an optimal beam by performing singular value decomposition (SVD) using the selectively reconstructed channel or to increase the performance of multiple input multiple output (MIMO).

FIGS. 2, 3, 4, 5, and 6 show the results of extracting BMCCs by OMP from channels having different characteristics according to an embodiment. In this embodiment, it is assumed that $N_t$=16 and $N_r$=64. Further, the resolution of $\theta_l$ and $\phi_l$ is set to G=64, and the resolution of delay is set to T=4000.

Figure 4:
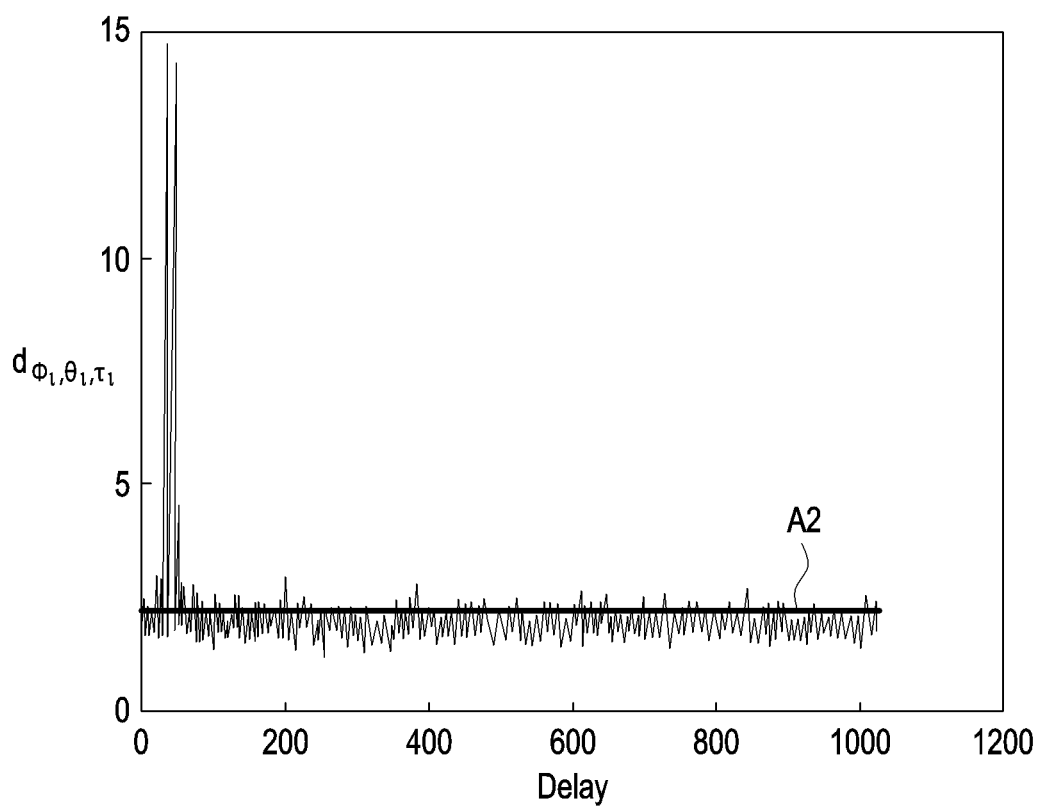
FIG. 4 is a view illustrating an initial value of a BMCC, which is a most appropriate channel component according to a delay when M=10, according to an embodiment of the disclosure.
Figure 5:
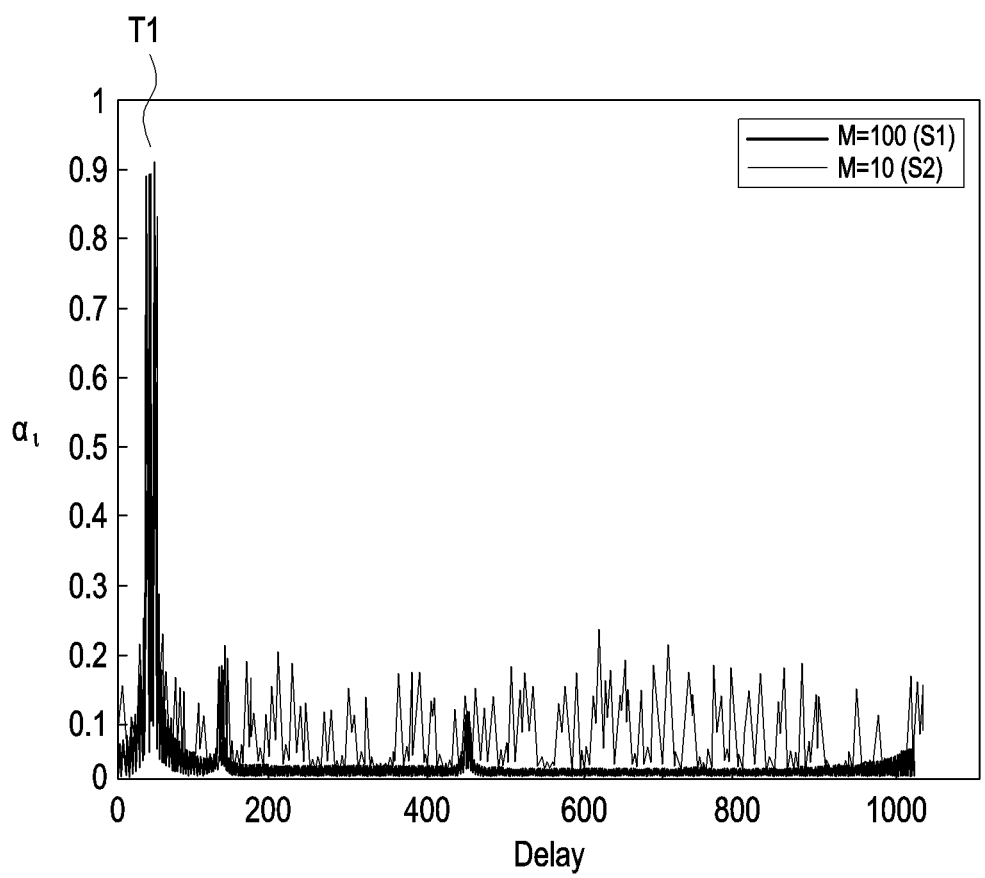
FIG. 5 is a view illustrating a line of sight (LoS) channel reconstructed based on an extracted BMCC when M=100 and M=10, according to an embodiment of the disclosure.
Figure 6:
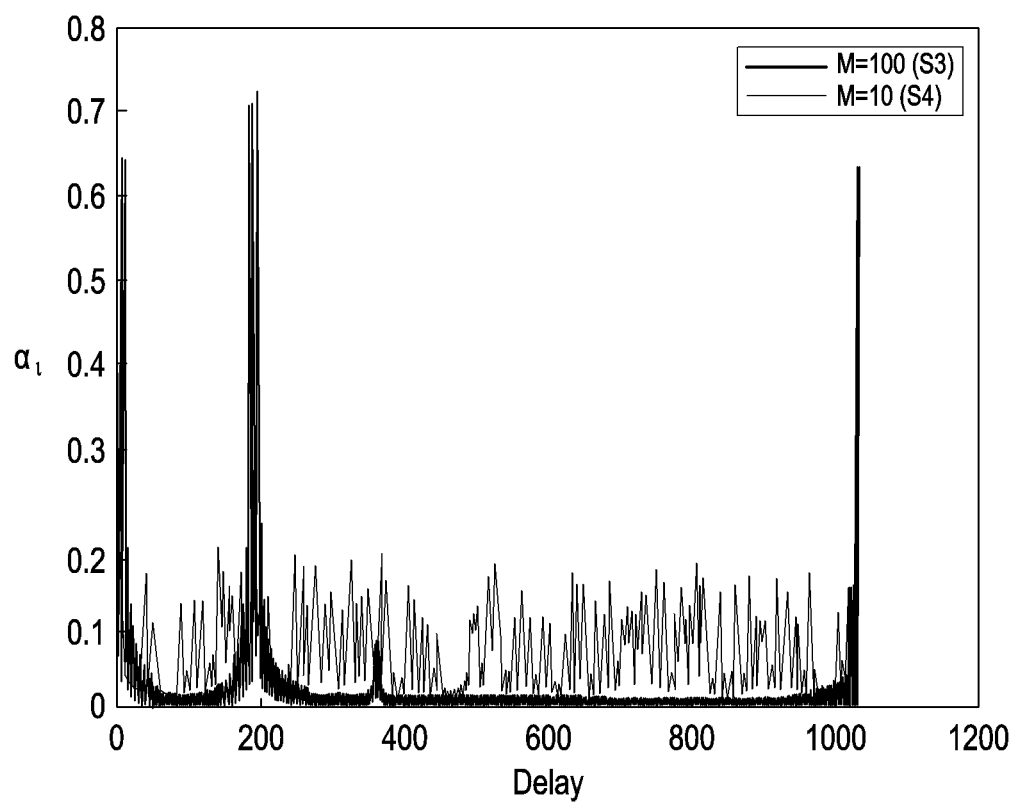
FIG. 6 is a view illustrating a channel reconstructed based on an extracted BMCC when M=100 and M=10 in a non-line of sight (NLoS) channel according to an embodiment of the disclosure.

FIGS. 2, 3, 4, and 5 illustrate an embodiment in a LoS channel, and FIG. 6 illustrates an embodiment in a non-LoS channel.

Figure 2:
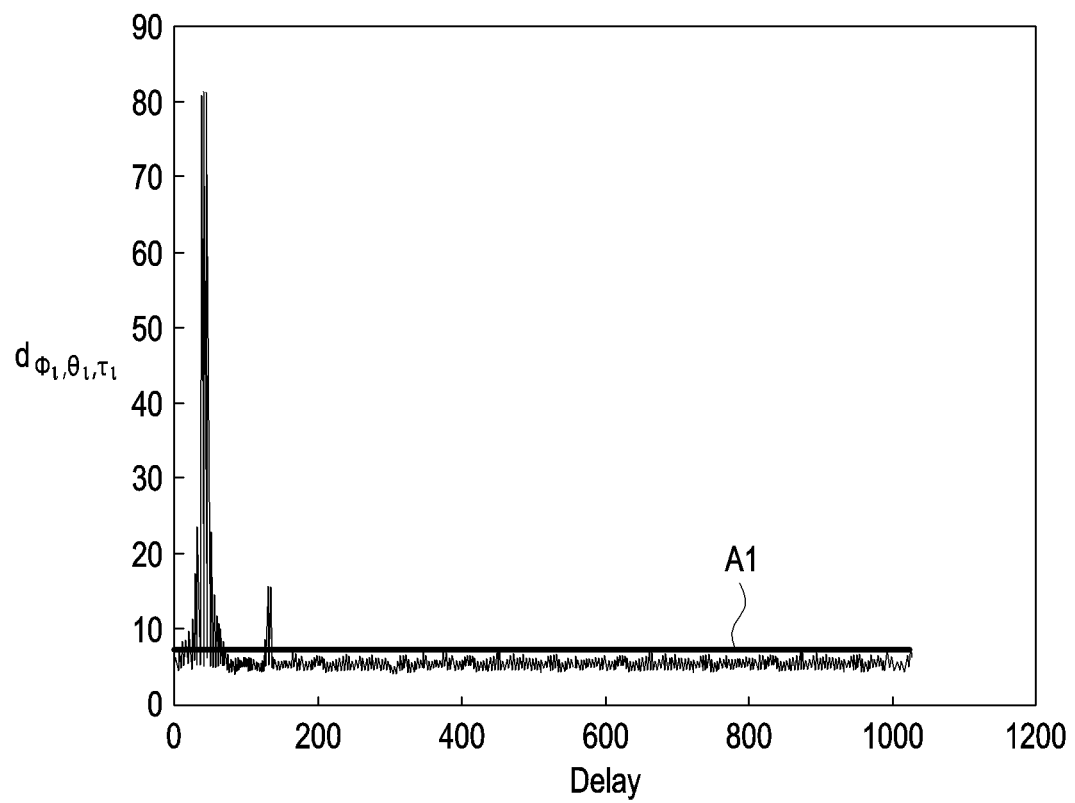
FIG. 2 is a view illustrating a channel reconstructed based on a finally extracted best matching channel component (BMCC) when M=100 according to an embodiment of the disclosure.

FIG. 2 is a graph illustrating the initial value of $d_{\phi^*_l,\theta^*_l,\tau^*_l}$ when the number M of pilot signals is 100 (i.e., M=100) according to an embodiment of the disclosure. Here, ($\phi^*_l$, $\theta^*_l$) is the optimal AoA and AoD which maximizes $d_{\phi_l,\theta_l,\tau_l}$ in the grid, for each delay component $\tau_l$.

Referring to FIG. 2, line A1 indicates a threshold, and illustrated is an example situation in which the number of BMCCs exceeding the threshold is two in total. Here, it is possible to repeatedly extract BMCCs so that all BMCCs fall below the threshold through OMP.

Figure 3:
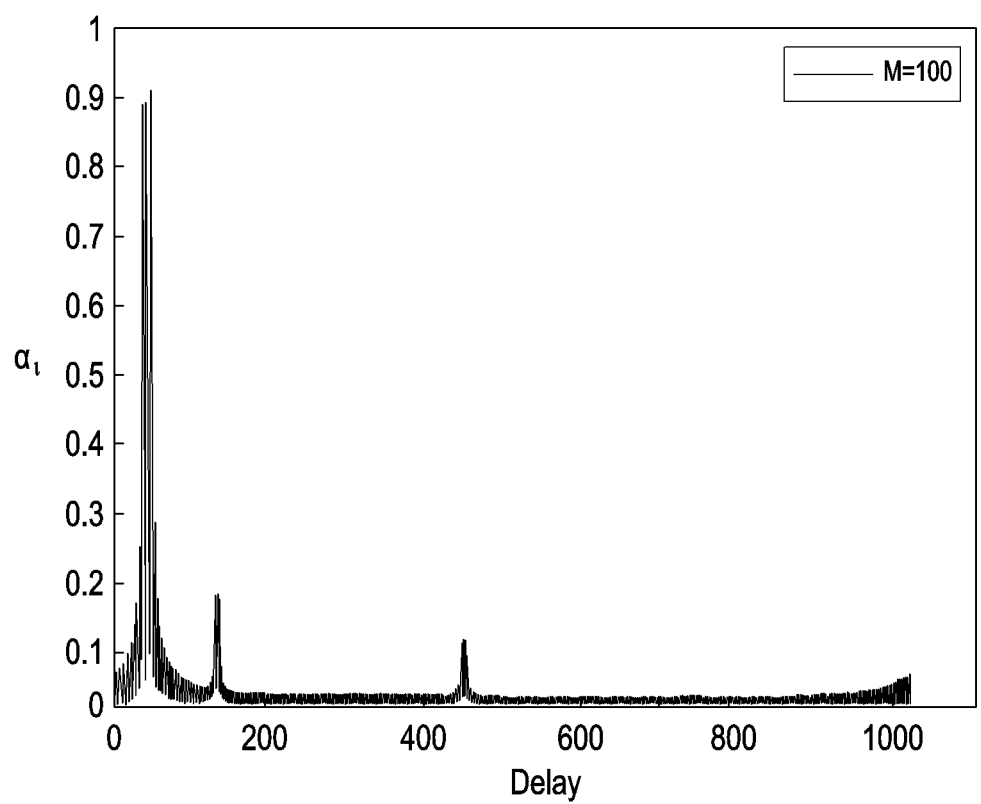
FIG. 3 is a view illustrating a channel reconstructed based on a finally extracted BMCC when M=100 according to an embodiment of the disclosure.

FIG. 3 is a graph illustrating the results of extracting a path using a gain ($\alpha_l$) in such a manner as to obtain a BMCC when M=100 according to an embodiment of the disclosure.

Referring to FIG. 3, it is shown that a total of three paths are finally extracted.

FIG. 4 is a graph illustrating an initial value of for each delay component $\tau_l$ when M=10 according to an embodiment of the disclosure.

Referring to FIG. 4, line A2 in FIG. 4 is a predetermined threshold and it may be seen that there are a plurality of BMCCs exceeding the threshold, unlike in FIG. 2. This corresponds to a situation in which channel sparsity is broken because the number of pilot signals is limited to a relatively small number, e.g., 10, so that it is impossible to extract an optimal channel element.

FIG. 5 is a graph illustrating a delay and a gain ($\alpha_l$) when M=100 (S1) and M=10 (S2), according to an embodiment of the disclosure.

Referring to FIG. 5, it shows a channel recovered based on each extracted BMCC. It may be identified that when M=100, a total of three paths were extracted as illustrated in FIG. 3, but many unwanted paths (those with low channel component values) were extracted when M=10 despite the same channel. However, since the channel for the test is a line of sight (LoS), it may be identified that the dominant path (T1) is secured in both the cases of M=100 and M=10. In this case, it is possible to select an optimal analog beam in the LoS direction.

FIG. 6 is a graph illustrating a delay and a gain ($\alpha_l$) when M=100 and M=100 in a non-Los (NLos) channel according to an embodiment of the disclosure.

Referring to FIG. 6, it exemplifies the finally estimated channel recovered based on the extracted BMCC. As shown in FIG. 5, unlike when M=100 (S3), when M=10 (S4), a large number of unwanted paths (those with low channel component values) are extracted so that it is hard to search for the optimal beam due to the inaccuracy of the reconstructed channel. In other words, it may be identified that the accuracy of the BMCC varies depending on the number of pilot signals, and it may be identified that sufficient pilot signals need to be secured to obtain a BMCC of high accuracy. However, overhead due to an increase in the number of pilot signals needs to be considered, and therefore, it may be considered to perform the task of reproducing channel characteristics of a level that may be secured with a large number of pilot signals, using only the characteristics of a small number of pilot signals. It is possible to perform the reproduction task for increasing channel accuracy only with limited pilot signals using a neutral network previously trained by deep learning to be capable of high-accuracy channel estimation even with a small number of pilot signals.

Figure 7:
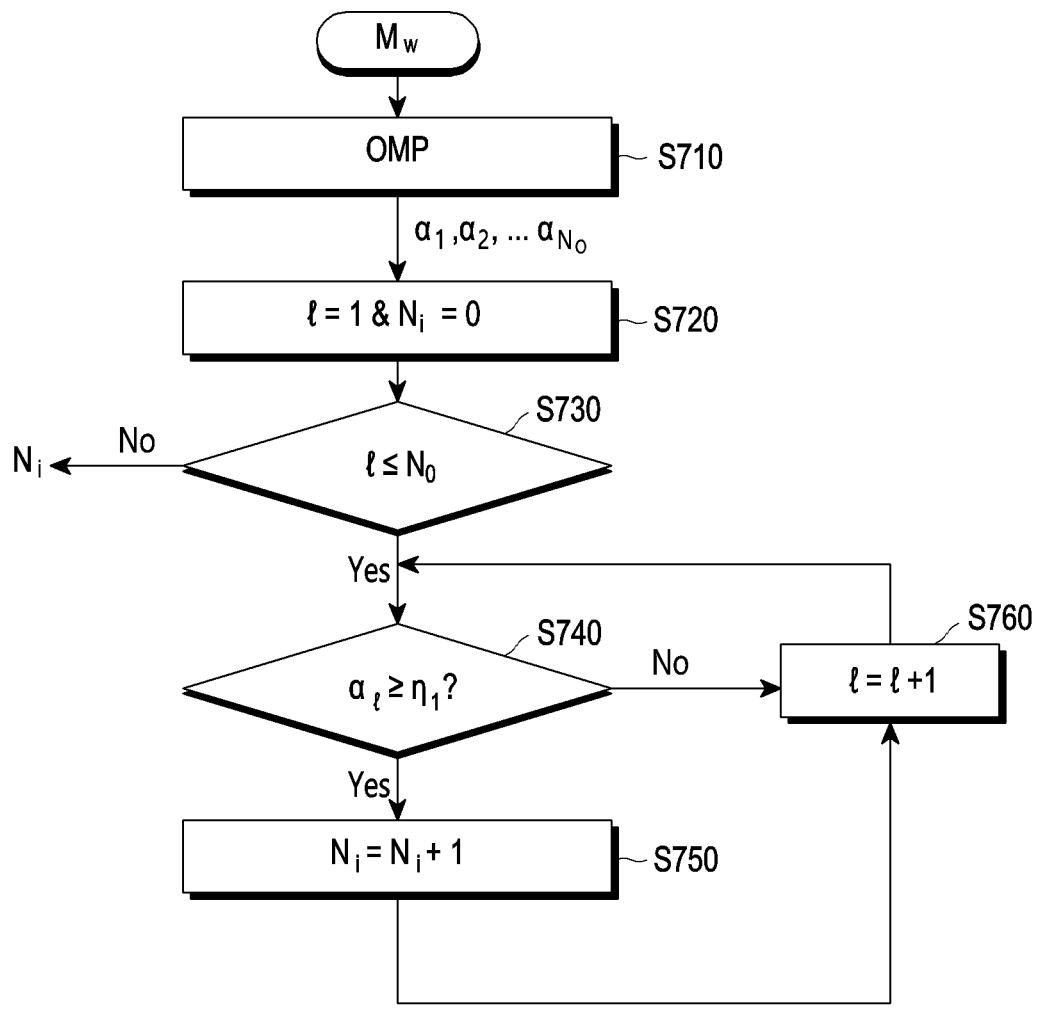
FIG. 7 is a view illustrating a process of extracting a BMCC with Ni (where i=1 or 2) exceeding a specific threshold $\eta_1$ when a measurement matrix $M_W$ is given by a reception pilot signal and whitening according to an embodiment of the disclosure.

FIG. 7 is a flowchart illustrating a process of extracting a BMCC with $N_i$ (where i=1 or 2) exceeding a specific threshold $\eta_l$ when a measurement matrix $M_w$ is given by a reception pilot signal and whitening according to an embodiment of the disclosure.

Referring to FIG. 7, first, $N_0$ BMCCs are searched through OMP described in Equations 9, 10, and 11 at operation S710. From the $N_0$ BMCCs, $\alpha_l$, l=1, . . . , $N_0$ may be obtained. It is assumed that the initial l value is 1, and $N_i$ is 0 at operation S720. BMCCs may be extracted through iterations. Here, since the number of periodically received pilot signals is very small (e.g., M=5), BMCCs may be inaccurate but, given that the path where the gain $\alpha_l$ corresponding to the channel path is larger than a predetermined threshold $\eta_l$ is a dominant path, $N_i$ BMCCs used for beam selection are set. In other words, as $\eta_l$, a value higher than the threshold used in OMP needs to be used, and it has the relationship of $N_0 \supseteq N_i$, where i=1 or 2. It is determined whether l is greater than or equal to $N_0$ at operation S730. If l is greater than $N_0$, $N_i$ is immediately determined. If l is smaller than or equal to $N_0$, it is determined whether the obtained gain ($\alpha_l$) is greater than or equal to the threshold $\eta_l$ at operation S740. If the gain ($\alpha_l$) obtained as a result of the determination is greater than or equal to the threshold $\eta_l$, 1 is added to $N_i$ at operation S750. Otherwise, 1 is added to l, increasing the number of iterations at operation S760. If the gain ($\alpha_l$) obtained as a result of the determination is smaller than the threshold $\eta_l$, 1 is immediately added to 1, increasing the number of iterations. Although it is described with reference to FIG. 7 that BMCCs are estimated using OMP, embodiments of the disclosure are not limited to OMP.

Figure 8:
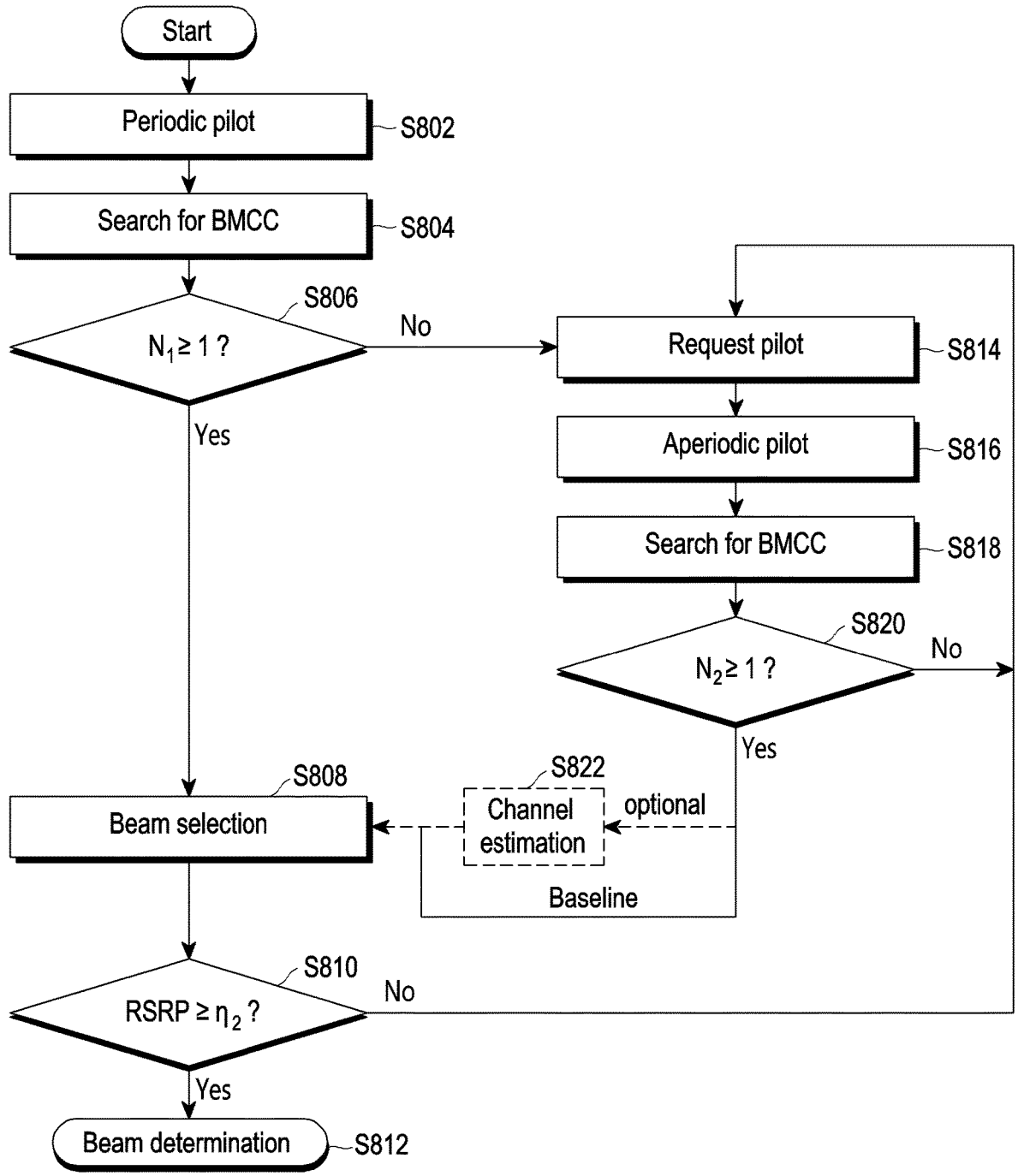
FIG. 8 is a view illustrating an overall procedure for a beam selection method through channel estimation according to an embodiment of the disclosure.

FIG. 8 is a flowchart illustrating an overall beam selection method through channel estimation according to an embodiment of the disclosure.

Referring to FIG. 8, first, the UE receives a small number of periodic pilot signals (reference signals) from the BS at operation S802 and then extracts $N_1$ reference channel component values (BMCC) in the same or a similar manner as that described in connection with FIG. 7 at operation S804. By receiving pilot signals and extracting BMCCs, it is possible to identify the main characteristics of the channel, such as whether the channel has the line of sight and the approximate path AoA and AoD. For the BMCCs finally extracted according to the procedure of FIG. 7, the number of BMCCs whose channel component value is larger than a specific threshold $\eta_l$ is $N_1$. The UE identifies whether $N_1 \geq 1$ at operation S806. If $N_1 \geq 1$, the number of BMCCs whose channel component value is equal to or greater than the threshold is one or more. Thus, under the assumption that sufficient dominant paths have been secured, a beam is selected by ($\phi_l$, $\theta_l$) having the largest value from among $N_1$ BMCCs, or a beam obtained by linear combination of $N_i$ BMCCs in the form of ($\Sigma_{l=1}^{N_i} a_{TX}(\phi_l)$, $\Sigma_{l=1}^{N_i} \alpha_1 a_{RX}(\phi_l)$) may be formed at operation S808.

Meanwhile, at operation S806, since the case where $N_1=0$ is the context where no dominant path of BMCC is extracted, the BS or the UE, which is the subject of beam selection, transmits a control information for requesting an additional pilot for gradual channel enhancement at operation S814. This is intended for enhancing channel accuracy by increasing the number of additional pilots. The added pilot signal may be received as an aperiodic pilot signal at operation S816.

If a measurement matrix with sufficient resolution is secured by adding the received aperiodic pilot signals, BMCCs may be extracted with higher accuracy, and channels for each antenna element in subcarrier units with higher accuracy may be secured through channel reconstruction at operation S818. After BMCC extraction at operation S818, it is identified that the number of extracted BMCCs whose channel component value is larger than a specific threshold $\eta_l$ is $N_2$ at operation S820. As for $N_1$, if $N_2 \geq 1$, a beam may be selected or generated by inter-angle linear combination of or using the maximum value in $N_2$ BMCCs at operation S808. Unless $N_2 \geq 1$, the process may return to operation S814, transmitting a control signal for requesting an additional pilot signal to the BS. Additionally, channel estimation may be performed using the determined BMCCs at operation S822.

The signal quality of the beam selected at operation S808 is determined at operation S810. The signal quality may include reference signals received power (RSRP). Unless the signal quality is better than the predetermined threshold $\eta_2$, the BS or UE, which is the subject of beam selection, may send control information requesting an additional pilot. If the signal quality is better than the predetermined threshold $\eta_2$, signal transmission/reception may be performed using the beam at operation S812.

Figure 9:
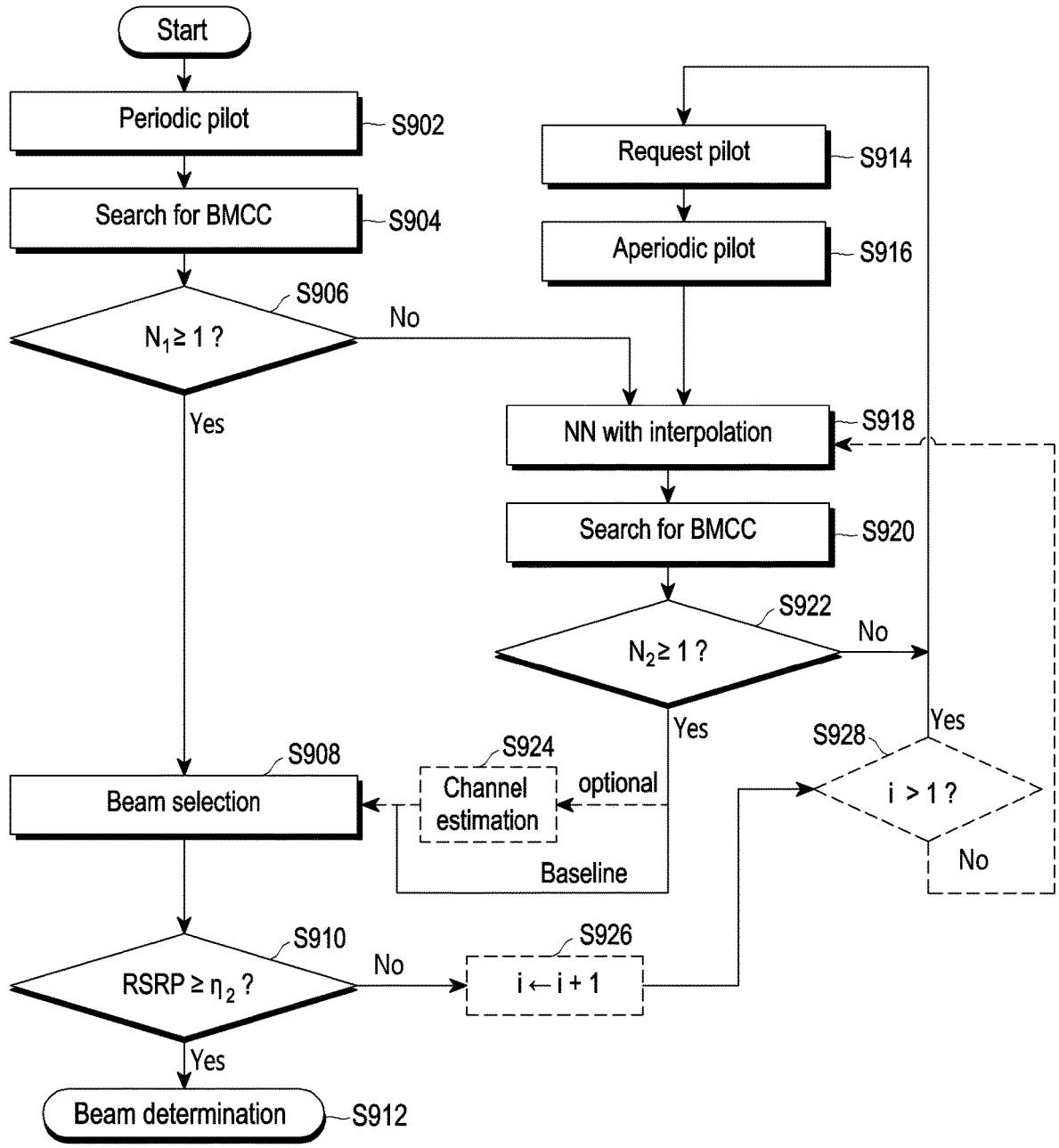
FIG. 9 is a view illustrating an overall procedure for a beam selection method through channel estimation based on a deep learning technique according to an embodiment of the disclosure.

FIG. 9 is a flowchart illustrating an overall beam selection method through channel estimation based on deep learning technology according to an embodiment of the disclosure.

Referring to FIG. 9, first, the UE receives a small number of periodic pilot signals (reference signals) from the BS at operation S902 and then extracts $N_1$ BMCCs in the same or a similar manner as that described in connection with FIG. 7 at operation S904. If the number of iterations for beam selection is i, i is reset to 0 simultaneously when the periodic pilot signal is received, searching for BMCCs. By receiving periodic pilot signals and extracting BMCCs, it is possible to identify the main characteristics of the channel, such as whether the channel has the line of sight and the approximate path AoA, AoD, and delay. For the BMCCs finally extracted according to the procedure of FIG. 7, the number of BMCCs whose channel component value is larger than a specific threshold $\eta_l$ is $N_1$. The UE identifies whether $N_1 \geq 1$ at operation S906. If $N_1 \geq 1$ the number of BMCCs whose channel component value is equal to or more than the threshold is one or more. Thus, under the assumption that sufficient dominant paths have been secured, a beam is selected by ($\phi_l$, $\theta_l$) having the largest value from among $N_1$ BMCCs, or a beam obtained by linear combination of $N_1$ BMCCs in the form of ($\Sigma_{l=1}^{N_i} a_{TX}(\phi_l)$, $\Sigma_{l=1}^{N_i} \alpha_1 a_{RX}(\phi_l)$) may be formed at operation S908.

Since the case where $N_1=0$ at operation S906 is the context where no BMCC of a dominant path has been extracted, it may be performed to enhance the resolution of pilot signals. In this case, a reproduction task to have more sophisticated channel characteristics through a neural network (NN) formed based on deep learning may be performed at operation S918. This is to allow interpolation to precede to map the measurement matrix obtained with a relatively small number of pilot signals during reproduction of channel characteristics with the dimension of the measurement matrix obtainable with a target number of pilot signals. BMCCs are again extracted by performing interpolation at operation S920. In this case, since inaccurate interpolation significantly affects the accuracy of the measurement matrix obtained through the NN, the number of BMCCs, obtained via interpolation, whose channel component value is larger than a specific threshold $\eta_3$ (the threshold may be equal to the threshold $\eta_1$) is $N_2$. The UE identifies whether $N_2 \geq 1$ at operation S922. At operation S922, unless $\geq 1$, the BS or UE, which is the subject of beam selection, may transmit control information for requesting an additional pilot signal at operation S914. If a measurement matrix with sufficient resolution is secured by adding the received aperiodic pilot signal, BMCCs may be extracted with higher accuracy, and it is possible to secure per-antenna element channels in higher-accuracy subcarrier units through channel reconstruction.

An aperiodic pilot signal is received according to the request for an additional pilot signal at operation S916.

Resolution enhancement of pilot signals is performed through interpolation using the NN of operation S918 using the additional pilot signals. BMCCs are again obtained through interpolation at operation S920, and then, the number of obtained BMCCs whose size is a specific threshold 13 is identified, and the UE identifies whether $N_2 \geq 1$ at operation S922. If $N_2 \geq 1$, a beam is selected or generated through inter-angle linear combination or using the maximum value in the $N_2$ BMCCs like in the beam selection method of FIG. 8 at operation S908. Additionally, channel estimation may be performed using the determined BMCCs at operation S924.

The signal quality of the beam selected at operation S908 is determined at operation S910. The signal quality may include RSRP. Unless the signal quality is same of or higher than the predetermined threshold $\eta_2$, the number of iterations is increased at operation S926. It is determined whether i is greater than 1 at operation S928. If i=0, BMCCs may be searched again by neural network interpolation without a request for additional pilot signals but, when i>1, it means that no BMCC has been searched or a wrong BMCC has been searched, so that a request for an additional pilot is necessary. The BS or UE, which is the subject of beam selection, may transmit control information for requesting an additional pilot signal at operation S914. If the signal quality is same of or better than the predetermined threshold $\eta_2$, the signal may be transmitted/received using the beam at operation S912.

Figure 10:
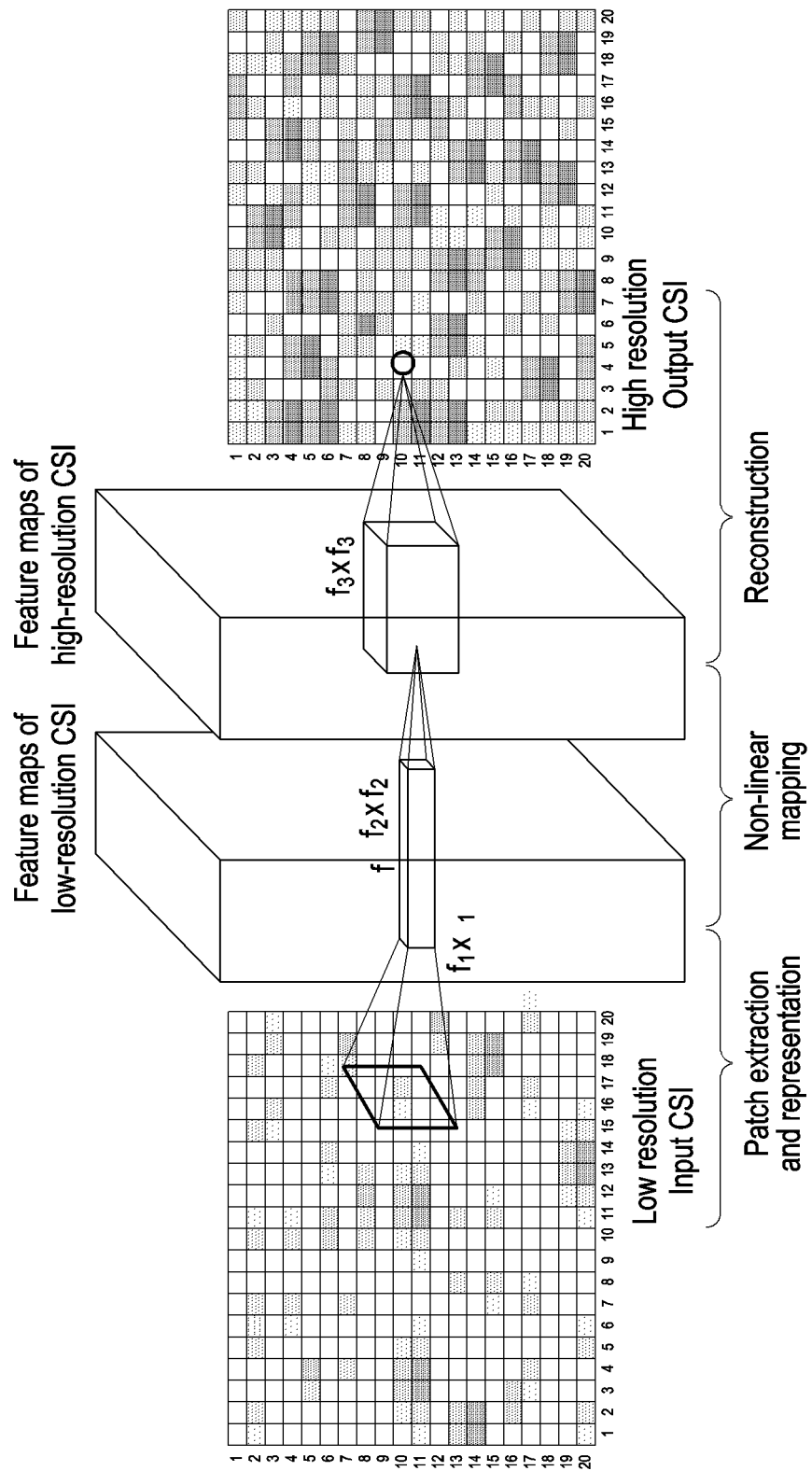
FIG. 10 is a view illustrating a structure of a super resolution convolutional NN (SRCNN) as an example of a neural network (NN) required for a beam selection method through deep learning-based gradual channel estimation according to an embodiment of the disclosure.

FIG. 10 illustrates a structure of a super resolution convolutional NN (SRCNN) as an embodiment of implementing a neural network (NN) according to an embodiment of the disclosure. The SRCNN is an NN for reconstructing a low-resolution image into a high-resolution image in image processing and is an NN structured to reconstruct a low-resolution measurement matrix into a high-resolution measurement matrix. The input/output data of the SRCNN may be data related to the pilot signal.

Referring to FIG. 10, the vertical axis indicates the subcarrier in the frequency domain, and the horizontal axis indicates the pilot signal number. In FIG. 10, a count of 20×20 is shown. For deep learning training, each BS or UE has a sufficient amount of pilots (M≥100) for clear BMCC extraction. As many columns as the number (e.g., M=5) of pilot signals necessary for actual periodic pilots are randomly extracted through the received measurement matrix $M_w^{(M=100)}$ to thereby generate $M_w^{(M=5)}$, and SRCNN deep learning training is performed which operates the operation to indicate the measurement matrix actually when M=100 using five pilot signals extracted. The NN on which deep learning has been performed may reconstruct the measurement matrix with the same resolution as that obtained by using the number (e.g., M=5) of pilot signals obtainable through periodic pilot signals, with the measurement matrix having the same resolution as that obtained using a sufficient number of pilot signals) (M≥100). Unlike this embodiment, NNs having a different structure that may achieve such purpose may be used as well.

Figure 11:
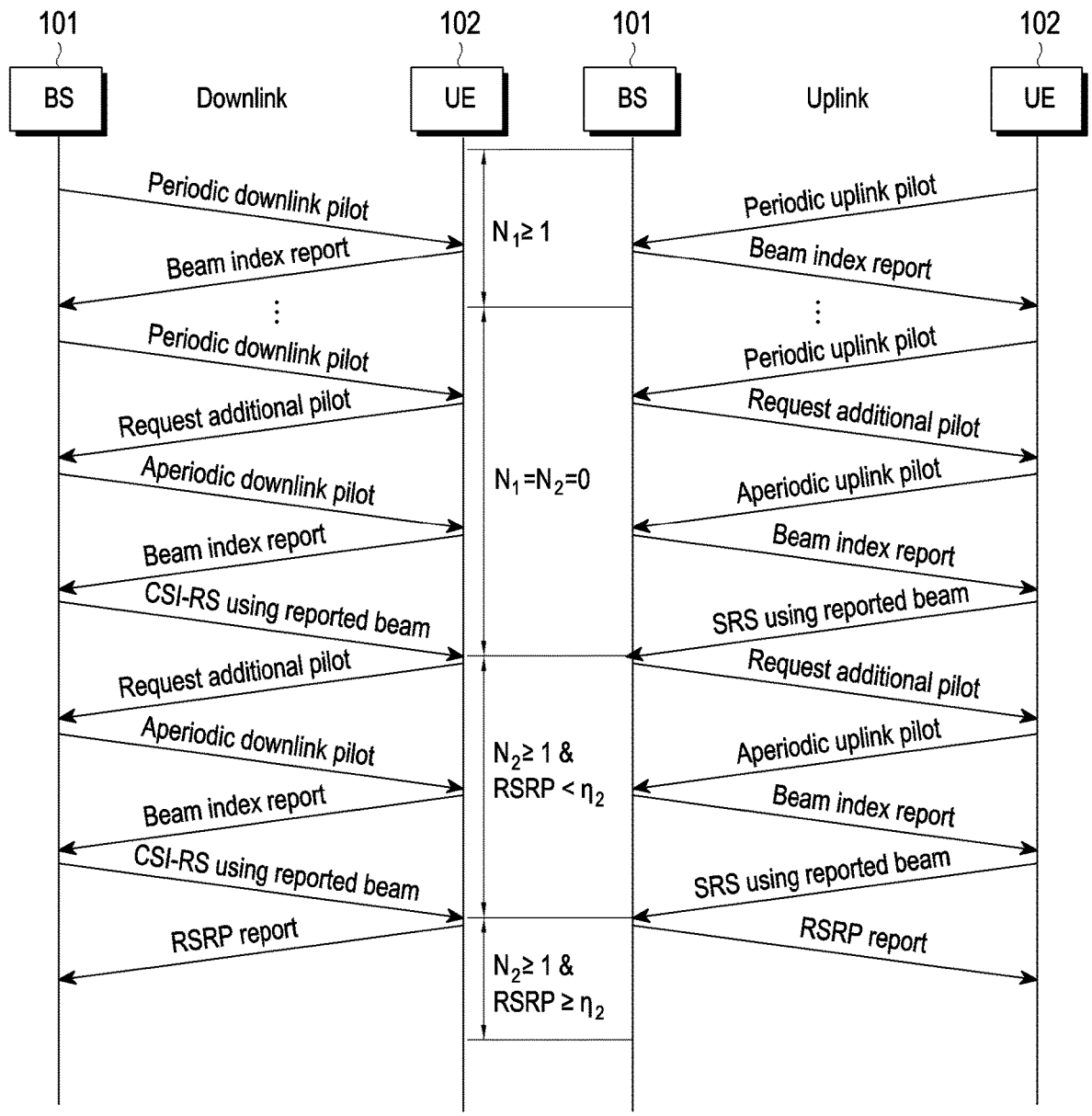
FIG. 11 is a view illustrating a procedure between a BS and a UE of a beam selection method through deep learning-based gradual channel estimation in uplink and downlink according to an embodiment of the disclosure.

FIG. 11 illustrates a signaling procedure between a BS 101 and a UE 102, on uplink and downlink, according to an embodiment of the disclosure.

Referring to FIG. 11, it illustrates signal transmission and reception, on downlink, between the BS 101 and the UE 102 and signal transmission and reception, on uplink, between the BS 101 and the UE 102. Transmission and reception of the signals may correspond to the embodiments of FIG. 8 or FIG. 9. In FIG. 11, procedures may be varied depending on how many BMCCs have been extracted. First, periodic pilot signals are received on both uplink and downlink and, if the number of beams whose channel component value exceeds the threshold or is same of the threshold among the BMCCs extracted through the periodic pilot signals is one or more, communication is performed using a beam selected through the beam selection procedure (A-1).

If the number of beams exceeding the predetermined threshold among the extracted BMCCs is zero, the BS 101 or the UE 102 may request the UE 102 or the BS 101 to transmit an additional pilot signal. The additional pilot signal is received by the BS 101 or the UE 102 via an aperiodic signal. The BS 101 or UE 102 may extract BMCCs through the received additional pilot signal and select a beam exceeding the threshold and perform communication (A-2).

If the BMCC obtained through the additional pilot signal exceeds the predetermined threshold, but the signal quality of the beams is lower than the predetermined threshold $\eta_2$, the BS 101 or the UE 102 may request an additional pilot signal. In response to the request for an additional pilot signal, the BS 101 or UE 102 may receive an aperiodic pilot signal (A-3).

If the BMCC obtained through the additional pilot signal exceeds or is same of the predetermined threshold and the signal quality of the beams is same of or higher than the predetermined threshold $\eta_2$, a beam is selected or generated using the maximum value in the $\eta_2$ BMCCs or by inter-angle linear combination (A-4).

Periodic pilots are transmitted basically using UE-specific pilot signals, like CSI-RSs in 5G, but group-specific pilot signals, such as quasi-co-location (QCL), may also be used. In the case of downlink, cell-specific pilot signals may be used as well. Aperiodic pilot signals are also operated basically as UE-specific pilot signals but, in the case of downlink, they may also be operated as group-specific pilot signals.

FIG. 12 illustrates an embodiment of comparison in normalized mean square error (NMSE) performance between the channel obtained using M pilots different for SNRs in three different ranges and the channel reconstructed using a relatively small number M of pilot signals, wherein $\eta_1=0.5$ and $\eta_2=0$ are assumed as thresholds according to an embodiment of the disclosure.

Referring to FIG. 12, it may be identified that in all the SNR ranges, the performance of the channel calculated by reconstructing the measurement matrix, where M=100, through NN interpolation on M=10 is better than the performance of the channel when M=80. It is also identified that a better performance is produced when a best beam pair suitable for the environment is determined than when a beam pair is randomly determined in period or aperiodic pilots. This is why the pilot received in the beam pair suitable for the environment has more meaningful channel characteristics than a random pilot and it has made interpolation more accurate.

Figure 13:
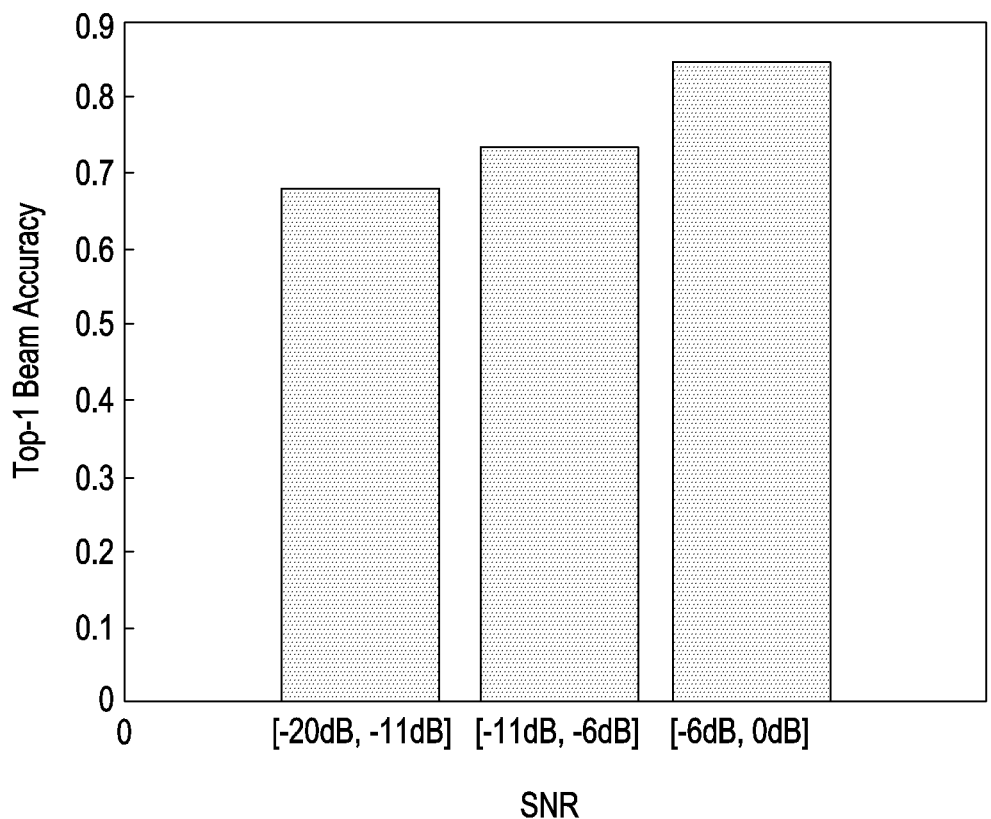
FIG. 13 is a view illustrating the beam accuracy of a top-1 beam in a low SNR range according to an embodiment of the disclosure.

FIG. 13 illustrates the beam accuracy when the best beam is selected for SNRs in different ranges and, as in FIG. 10, $\eta_1=0.5$ and $\eta_2=0$ are assumed as thresholds according to an embodiment of the disclosure.

Referring to FIG. 13, the SNR ranging from −20 db to −11 db presents a beam accuracy of about 68%, and the SNR ranging from −11 db to −6 db presents a beam accuracy of about 74%. In particular, at the SNR ranging from −6 dB to 0 dB, a beam accuracy of nearly 85% results and, as the SNR range increases, it is expected to reach nearly 100%.

Figure 14:
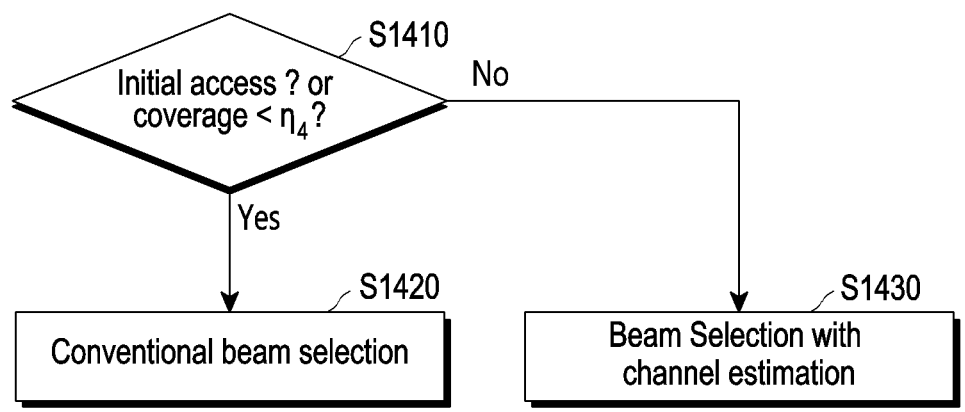
FIG. 14 is a view illustrating a hybrid structure of beam selection through a beam selection method of the related art and proposed deep learning-based gradual channel estimation according to an embodiment of the disclosure.

FIG. 14 illustrates the structure of a hybrid scheme considering a situation in which the gradual channel estimation scheme proposed in the disclosure is not applied in a situation in which a pilot signal is not actually received according to an embodiment of the disclosure.

Referring to FIG. 14, in other words, the BS 101 or the UE 102 determines that coverage is a predetermined threshold ($\eta_4$) or more like it is currently in the initial access process or at the cell boundary and determines whether pilot reception is possible at operation S1410. If it is in the initial access process or the coverage is smaller than the threshold as a result of determination at operation S1410, a RSRP-based beam selection scheme of the related art is used at operation S1420. If the coverage of reception of pilot signals is same of or larger than the threshold as a result of determination at operation S1410, a beam selection scheme according to an embodiment of the disclosure may be used at operation S1430. Thus, the beam selection scheme of the related art and the beam selection scheme proposed according to the disclosure are operated complementary to each other.

Figure 15:
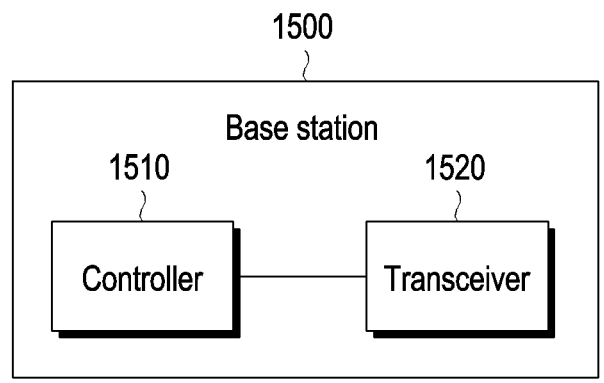
FIG. 15 is a view illustrating a structure of a BS according to an embodiment of the disclosure.

FIG. 15 is a view illustrating a structure of a BS 1500 according to an embodiment of the disclosure.

Referring to FIG. 15, according to an embodiment, a BS may include at least one controller (e.g., a processor) 1510 and a transceiver 1520 including a receiver and a transmitter. The BS may include a memory (not shown). The transceiver 1520 and the memory may be connected to the at least one controller 1510 to be operated under the control of the at least one controller 1510.

At least one controller 1510 may control a series of processes so that the operations of the BS described in connection with the embodiments of FIGS. 1 to 14 may be performed. The transceiver 1520 may transmit and receive signals to/from the UE 1600 and other network apparatus. The signals may include control messages and data information.

Figure 16:
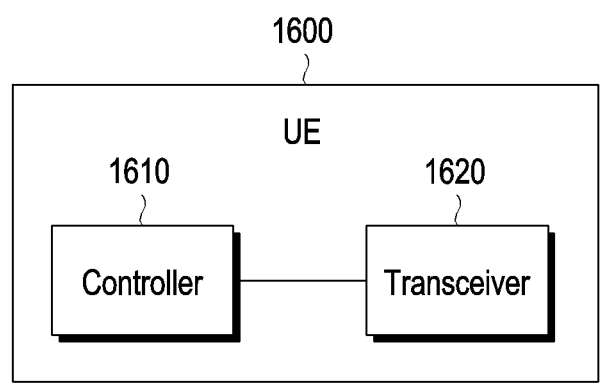
FIG. 16 is a view illustrating a structure of a UE according to an embodiment of the disclosure.

FIG. 16 is a view illustrating a structure of a UE according to an embodiment of the disclosure.

Referring to FIG. 16, according to an embodiment, a UE may include at least one controller (or a processor) 1610 and a transceiver 1620 including a receiver and a transmitter. The UE may include a memory (not shown). The transceiver 1620 and the memory may be connected to the at least one controller 1610 to be operated under the control of the at least one controller 1610.

At least one controller 1610 may control a series of processes so that the operations of the UE described in connection with the embodiments of FIGS. 1 to 14 may be performed. The transceiver 1620 may transmit and receive signals to/from the BS 1500 and a network apparatus. The signals may include control information and data.

Figure 17:
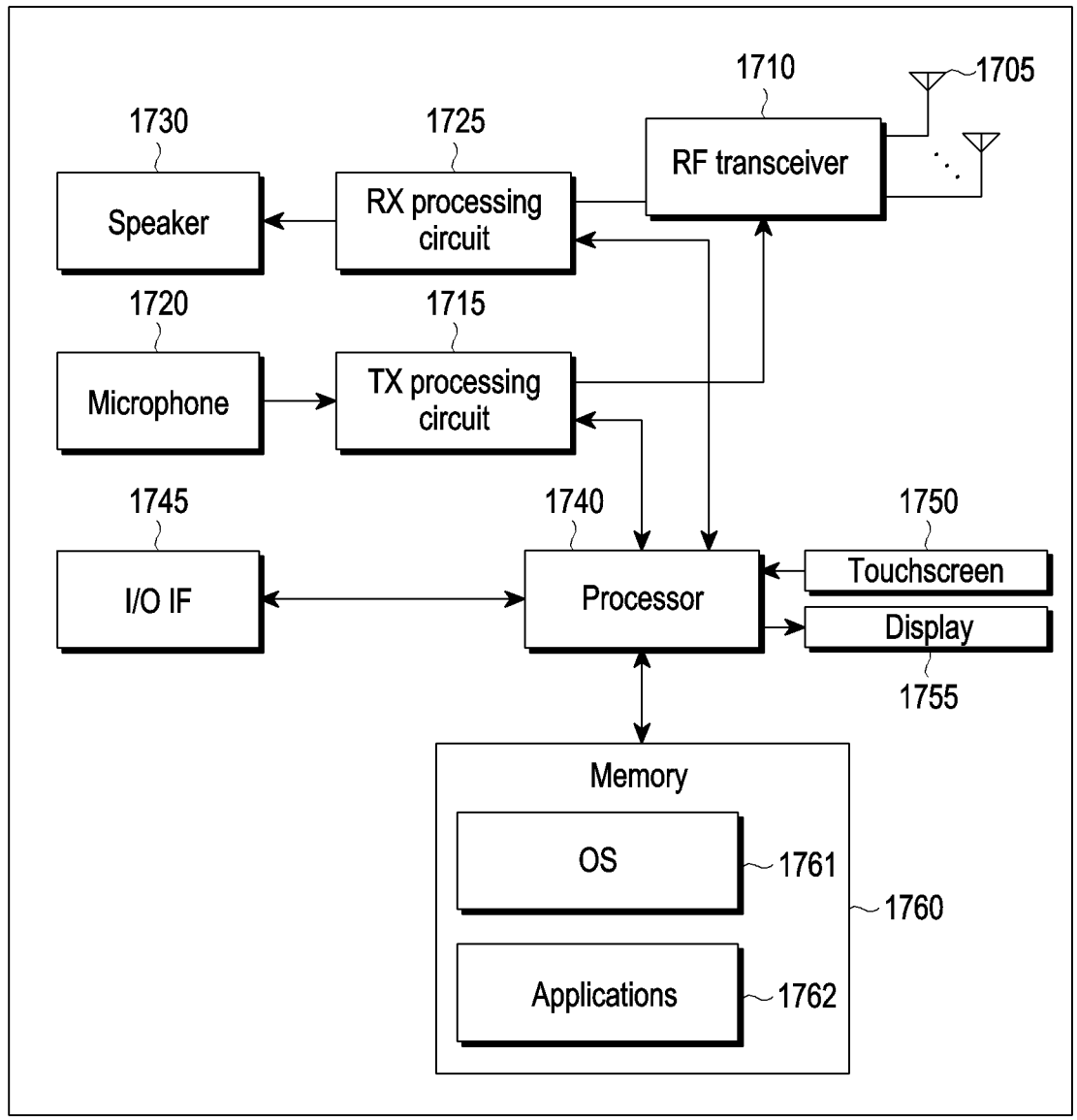
FIG. 17 is a view illustrating another example internal structure of a UE in a wireless communication system according to an embodiment of the disclosure.

FIG. 17 is a view illustrating another example internal structure of a UE in a wireless communication system according to an embodiment of the disclosure.

The embodiment of the UE illustrated in FIG. 17 is for illustrative purposes only, and FIG. 17 does not limit the scope of the disclosure to any specific implementation of the UE.

Referring to FIG. 17, a UE includes an antenna 1705, a radio frequency (RF) transceiver 1710, a transmit (TX) processing circuit 1715, a microphone 1720, and a receive (RX) processing circuit 1725. The UE further includes a speaker 1730, a processor (controller) 1740, an input/output (I/O) interface (IF) 1745, a touch screen 1750, a display 1755, and a memory 1760. The memory 1760 includes an operating system (OS) 1761 and one or more applications 1762.

The RF transceiver 1710 receives an input RF signal transmitted from a base station in a network, via the antenna 1705. The RF transceiver 1710 down-converts the input RF signal, generating an intermediate frequency (IF) or baseband signal. The IF or baseband signal is transmitted to the RX processing circuit 1725, and the RX processing circuit 1725 filters, decodes, and/or digitizes the baseband or IF signal, generating a processed baseband signal. The RX processing circuit 1725 sends the processed baseband signal to the speaker 1730 (e.g., as for audio data) or the processor 1740 (e.g., as for web browsing data) for further processing.

The TX processing circuit 1715 receives analog or digital audio data from the microphone 1720 or other output baseband data (e.g., web data, emails, or interactive video game data) from the processor 1740. The TX processing circuit 1715 encodes, multiplexes, and/or digitizes the output baseband data, generating a processed baseband or IF signal. The RF transceiver 1710 receives the processed baseband or IF signal output from the TX processing circuit 1715 and up-converts the baseband or IF signal into an RF signal which is to be transmitted through the antenna 1705.

The processor 1740 may include one or more processors or other processing devices, and may execute the OS 1761 stored in the memory 1760 to control the overall operation of the UE. As an example, the processor 1740 may control reception of downlink channel signals and transmission of uplink channel signals by the RF transceiver 1710, the RX processing circuit 1725, and the TX processing circuit 1715 according to known principles. According to an embodiment, the processor 1740 includes at least one microprocessor or microcontroller.

In various embodiments, the processor 1740 may control the overall operation for managing the UE's network connection and session. In other words, the processor 1740 may control the overall operation for managing network connection and session as described with reference to FIGS. 1 to 15, as an example.

The processor 1740 may move data into or out of the memory 1760 as required by a running process. According to an embodiment, the processor 1740 is configured to execute the applications 1762 based on the OS program 1761 or in response to signals received from base stations or the operator. The processor 1740 is coupled to the I/O interface 1745, and the I/O interface 1745 provides the UE with connectivity to other devices, e.g., laptop computers and handheld computers. The I/O interface 1745 is a communication path between these accessories and the processor 1740.

The processor 1740 is also connected to the touch screen 1750 and the display 1755. The operator of the UE may input data into the UE using the touch screen 1750. The display 1755 may be a liquid crystal display, a light emitting diode display, or other displays capable of rendering text and/or at least limited graphics, such as from websites.

The memory 1760 is connected to the processor 1740. A portion of the memory 1760 may include a random access memory (RAM), and the remainder of the memory 1760 may include a flash memory or a read-only memory (ROM).

Although FIG. 17 illustrates an example UE, various changes may be made thereto. For example, various components of FIG. 17 may be combined together, each component may be further divided, or some components may be omitted, or other components may be added as necessary. As an example, the processor 1740 may be divided into multiple processors, such as one or more central processing units (CPUs) and one or more graphics processing units (GPUs). Although the UE is configured as a mobile phone or a smart phone in FIG. 17, the UE may be configured to operate as a different type of mobile or stationary device.

In the drawings illustrating methods according to embodiments, the order of description is not necessarily identical to the order of execution, and some operations may be performed in a different order or simultaneously.

Some of the components shown in the drawings illustrating methods according to embodiments may be omitted in such an extent as not to impair the gist or essence of the disclosure.

Although preferred embodiments of the disclosure have been shown and described in connection with the drawings and particular terms have been used, this is to provide a better understanding of the disclosure and is not intended to limit the scope of the disclosure. It is apparent to one of ordinary skill in the art that various changes may be made thereto without departing from the scope of the disclosure.

While the disclosure has been shown and described with reference to certain various embodiments thereof, it will be understood by those skilled in the art that various changes in form and details may be made therein without departing from the spirit and scope of the disclosure as defined by the appended claims and their equivalents.

What is claimed is:

1. A method performed by a receiving apparatus in a wireless communication system, the method comprising:
   receiving reference signals from a transmitting apparatus;
   estimating respective channel component values of the reference signals;
   identifying whether at least one first reference channel component value which is equal to or greater than a first threshold is present among the channel component values of the reference signals;
   interpolating the channel component values of the reference signals based on a deep learning-based channel estimation scheme in case that the at least one first reference channel component value is not present;
   identifying whether at least one second reference channel component value which is equal to or greater than the first threshold is present among the interpolated channel component values of the reference signals;
   selecting a first candidate beam based on the at least one second reference channel component value in case that the at least one second reference channel component value is present;
   identifying whether a value of signal quality of the first candidate beam is equal to or greater than a second threshold; and
   selecting the first candidate beam as a first final beam in case that the value of signal quality of the first candidate beam is equal to or greater than the second threshold.

2. The method of claim 1, further comprising:
   transmitting, to the transmitting apparatus, a signal requesting transmission of additional reference signals in case that the at least one first reference channel component value is not present;
   receiving the additional reference signals from the transmitting apparatus and estimating respective channel component values of the additional reference signals;
   identifying whether the at least one second reference channel component value which is equal to or greater than the first threshold is present among the channel component values of the additional reference signals;
   selecting a second candidate beam based on the at least one second reference channel component value in case that the at least one second reference channel component value is present; and
   selecting the second candidate beam as a second final beam in case that a value of signal quality of the second candidate beam is equal to or greater than the second threshold.

3. The method of claim 1, further comprising:
   transmitting, to the transmitting apparatus, a signal requesting transmission of additional reference signals in case that the value of signal quality of the first candidate beam is less than the second threshold;
   receiving the additional reference signals from the transmitting apparatus and estimating respective channel component values of the additional reference signals;
   identifying whether at least one third reference channel component value which is equal to or greater than the first threshold is present among the channel component values of the additional reference signals;
   selecting a second candidate beam based on the at least one third reference channel component value in case that the at least one third reference channel component value is present; and
   selecting the second candidate beam as a second final beam in case that a value of signal quality of the second candidate beam is equal to or greater than the second threshold.

4. The method of claim 1, wherein the channel component values include at least one of an angle of arrival (AoA), an angle of departure (AoD), or a delay.

5. The method of claim 1, wherein the reference signals include at least one of a channel state information reference signal (CSI-RS), a sounding reference signal, or a demodulation reference signal (DM-RS).

6. A receiving apparatus in a wireless communication system, comprising:
   a transceiver; and
   at least one processor configured to:
      receive reference signals from a transmitting apparatus,
      estimate respective channel component values of the reference signals,
      identify whether at least one first reference channel component value which is equal to or greater than a first threshold is present among the channel component values of the reference signals,
      interpolate the channel component values of the reference signals based on a deep learning-based channel estimation scheme in case that the at least one first reference channel component value is not present,
      identify whether at least one second reference channel component value which is equal to or greater than the first threshold is present among the interpolated channel component values of the reference signals,
      select a first candidate beam based on the at least one second reference channel component value in case that the at least one second reference channel component value is present,
      identify whether a value of signal quality of the first candidate beam is equal to or greater than a second threshold, and
      select the first candidate beam as a first final beam in case that the value of signal quality of the first candidate beam is equal to or greater than the second threshold.

7. The receiving apparatus of claim 6, wherein the at least one processor is further configured to:
   transmit, to the transmitting apparatus, a signal requesting transmission of additional reference signals in case that the at least one first reference channel component value is not present;

receive the additional reference signals from the transmitting apparatus and estimate respective channel component values of the additional reference signals;

identify whether the at least one second reference channel component value which is equal to or greater than the first threshold is present among the channel component values of the additional reference signals;

select a second candidate beam based on the at least one second reference channel component value in case that the at least one second reference channel component value is present; and select the second candidate beam as a second final beam in case that a value of signal quality of the second candidate beam is equal to or greater than the second threshold.

8. The receiving apparatus of claim 6, wherein the at least one processor is further configured to:

transmit, to the transmitting apparatus, a signal requesting transmission of additional reference signals in case that the value of signal quality of the first candidate beam is less than the second threshold;

receive the additional reference signals from the transmitting apparatus and estimate respective channel component values of the additional reference signals;

identify whether at least one third reference channel component value which is equal to or greater than the first threshold is present among the channel component values of the additional reference signals;

select a second candidate beam based on the at least one third reference channel component value in case that the at least one third reference channel component value is present; and select the second candidate beam as a second final beam in case that a value of signal quality of the second candidate beam is equal to or greater than the second threshold.

9. The receiving apparatus of claim 6, wherein the channel component values include at least one of an angle of arrival (AoA), an angle of departure (AoD), or a delay.

10. The receiving apparatus of claim 6, wherein the reference signals include at least one of a channel state information reference signal (CSI-RS), a sounding reference signal, or a demodulation reference signal (DM-RS).

11. The method of claim 1, wherein the deep learning-based channel estimation scheme comprises a super resolution convolutional neural network (SR-CNN) based channel estimation scheme.

12. The receiving apparatus of claim 6, wherein the deep learning-based channel estimation scheme comprises a super resolution convolutional neural network (SR-CNN) based channel estimation scheme.

* * * * *